United States Patent
Ekambaram et al.

(10) Patent No.: US 10,659,920 B1
(45) Date of Patent: May 19, 2020

(54) EFFICIENT DISCOVERY OF SURVIVORS IN DISASTER AREA USING ROBOTICS AND MOBILE NETWORKS

(71) Applicant: International Business Machines Corporation, Armonk, NY (US)

(72) Inventors: Vijay Ekambaram, Chennai (IN); Padmanabha Venkatagiri Seshadri, Mysore (IN); Vijay Kumar Ananthapur Bache, Bangalore (IN); Saravanan Sadacharam, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/242,145

(22) Filed: Jan. 8, 2019

(51) Int. Cl.
*H04M 11/04* (2006.01)
*H04W 4/024* (2018.01)
(Continued)

(52) U.S. Cl.
CPC .......... *H04W 4/024* (2018.02); *H04W 4/029* (2018.02); *H04W 4/90* (2018.02); *H04W 8/005* (2013.01); *H04W 48/16* (2013.01); *H04W 76/50* (2018.02)

(58) Field of Classification Search
CPC ....... H04W 4/024; H04W 4/029; H04W 4/90; H04W 76/50; H04W 8/005; H04W 48/15; H05M 1/72519; H04M 1/92522
(Continued)

(56) References Cited

U.S. PATENT DOCUMENTS 7,174,238 B1 * 2/2007 Zweig ................. G05D 1/0038
700/245
9,794,936 B2 * 10/2017 Sundberg .......... H04W 72/0406
(Continued)

FOREIGN PATENT DOCUMENTS

| CN | 106218748 A | 8/2016 |
| CN | 106647744 A | 11/2016 |
| CN | 107368073 A | 7/2017 |

OTHER PUBLICATIONS

"Five Robots that may Rescue you from Natural Disasters," http://www.livemint.com/Industry/Bfc02vJKzn7FcdwmXKtrIK/Five-robots-that-may-rescue-you-from-natural-disasters.html, Jun. 1, 2015, 7 pages.
(Continued)

*Primary Examiner* — Danh C Le
(74) *Attorney, Agent, or Firm* — Ryan, Mason & Lewis, LLP

(57) ABSTRACT

Systems and techniques for the quickly and efficiently locating survivors in a disaster area are disclosed. In some embodiments, the system comprises a plurality of robots distributed into a disaster area where each robot comprises at least one processor. The at least one processor is configured to receive discover packets broadcast by one or more mobile devices located in the disaster area. Each discover packet comprises information indicating how many other mobile devices in the disaster area are associated with the broadcasting mobile device. The at least one processor is further configured to determine a path along which to move the robot responsive to receiving one or more of the discover packets. The path is determined based at least in part on the received one or more of the discover packets. The at least one processor is further configured to cause the robot to move according to the determined path.

14 Claims, 7 Drawing Sheets

(51) Int. Cl.
*H04W 4/90* (2018.01)
*H04W 48/16* (2009.01)
*H04W 8/00* (2009.01)
*H04W 76/50* (2018.01)
*H04W 4/029* (2018.01)

(58) Field of Classification Search
USPC .......................... 455/404.1, 550.1, 418, 420
See application file for complete search history.

(56) References Cited

U.S. PATENT DOCUMENTS

| | | | |
|---|---|---|---|
| 2016/0259032 A1* | 9/2016 | Hehn | G01S 5/0289 |
| 2016/0375579 A1* | 12/2016 | Muttik | H04W 4/021 |
| | | | 700/250 |
| 2017/0013476 A1* | 1/2017 | Suthar | H04W 24/02 |
| 2017/0100838 A1* | 4/2017 | Lewis | B25J 9/1676 |
| 2017/0242431 A1* | 8/2017 | Dowlatkhah | G08C 17/02 |
| 2017/0257779 A1* | 9/2017 | Zerick | H04W 24/02 |
| 2017/0269594 A1* | 9/2017 | Sydnor | B64C 39/024 |
| 2018/0103036 A1* | 4/2018 | Fox | H04W 12/0609 |
| 2019/0102623 A1* | 4/2019 | Flood | G06K 9/00201 |
| 2019/0104496 A1* | 4/2019 | Sogo | H04B 17/318 |

OTHER PUBLICATIONS

Dani Cooper, "Cockroach-Inspired Robot Could Help Save Disaster Victims," http://www.abc.net.au/news/science/2016-02-09/cockroach-inspired-robot-could-help-save-disaster-victims/7149426, Feb. 8, 2016, 4 pages.

Jochem Vreeman, "Robots to Save Lives in Calamity Situations in the Alps," https://phys.org/news/2014-10-robots-calamity-situations-alps.html, Oct. 9, 2014, 2 pages.

Fraunhofer-Gesfhschaft, "Natural Disasters: Networking Robots and Sensor Systems to Help First Responders React More Quickly," https://www.sciencedaily.com/releases/2011/10/111017124255.htm, Oct. 19, 2011, 4 pages.

Chris Boyette, "Robots, Drones and Heart-Detectors: How Disaster Technology is Saving Lives," http://edition.cnn.com/2015/08/24/usirobot-disaster-technology/index.html, Oct. 5, 2015, 3 pages.

Wikipedia, "Soft Robotics," https://en.wikipedia.org/wiki/Soft_robotics, Nov. 7, 2018, 7 pages.

D. Van Story et al., "Approaches to Real-Time Ventricular Wall Strain Measurement for the Control of Soft Robotic Ventricular Assist Devices," the 9th Hamlyn Symposium on Medical Robotics, 2017, 2 pages.

F. Connolly et al., "Using Analytical Modeling to Design Customized Fiber-Reinforced Soft Actuators," Society of Engineering Science 53rd Annual Technical Meeting (SES), Oct. 2-5, 2016, 1 page.

A.-C. Petre et al., "Delay Tolerant Networks for Disaster Scenarios," Resource Management in Mobile Computing Environments, Modeling and Optimization in Science and Technologies, 2014, 25 pages, vol. 3.

A. Martín-Campillo et al, "Evaluating Opportunistic Networks in Disaster Scenarios," Journal of Network and computer Applications, 2013, pp. 870-880, vol. 36.

Brett Williamson, "Serval Mesh: Network-Free Communication Application for Disaster Zones Wins International Award," http://www.abc.net.au/news/2016-05-16/mobile-phone-app-to-create-emergency-network-wins-acclaim/7413482, May 16, 2016, 4 pages.

Fionán Mc Grath, "Mobile Network Restoration & Humanitarian Response: The Vodafone Foundation Instant Network Programme," GSMA Disaster Response, https://www.gsma.com/mobilefordevelopment/wp-content/uploads/2014/02/Mobile-Network-Restoration-and-Humanitarian-Response.pdf, Feb. 25, 2014, 20 pages.

"3D Modelling & Simulation," http://libertyindustrial.com.au/Deconstruction/3d-modelling/, downloaded Nov. 28, 2018, 3 pages.

H. Marvi et al., "Snakes Mimic Earthworms: Propulsion Using Rectilinear Travelling Waves," Journal of the Royal Society Interface, Jul. 6, 2013, 12 pages, vol. 10, No. 84.

M.R. Zolfaghari et al., "Probabilistic Seismic Damage Assessment for Urban Transportation Network," Technical Council on Lifeline Earthquake Engineering Conference (TCLEE), Jun. 28-Jul. 1, 2009, 8 pages.

"Cockroach Robots to the Rescue!" https://www.youtube.com/watch?v=81Zv8PPF8bE, Feb. 8, 2016, 2 pages.

* cited by examiner

US 10,659,920 B1

EFFICIENT DISCOVERY OF SURVIVORS IN DISASTER AREA USING ROBOTICS AND MOBILE NETWORKS

FIELD

The present application generally relates to emergency services, and, more particularly, to the use of robotics and mobile networks in detecting survivors in a disaster area.

BACKGROUND

A disaster, whether natural or man-made, may strike at any time. Natural or man-made disasters such as, e.g., earthquakes, hurricanes, tornadoes, floods, fires, explosions, structural failures, or other similar disasters, often cause considerable damage to buildings or other infrastructure. For example, a building may totally or partially collapse, walls may fall in, debris or rubble may accumulate, entry points may become blocked, or other similar damage may occur. As a result of this damage, individuals in the area may become trapped and in need of rescue.

Emergency responders often provide search and rescue services in the event of a disaster. For example, they may search the disaster area for voids or pockets in the debris or rubble where survivors may be trapped, e.g., due to the collapse of a wall or other infrastructure, or where survivors may have hidden such as under desks, in bath tubs, in stairwells, in a basement, etc.

Emergency responders typically attempt to find survivors during search and rescue operations in a variety of different ways. For example, they may visually inspect the disaster area in an attempt to spot survivors in the debris or rubble, e.g., by seeing an arm or a leg, or by calling out to survivors to identify their locations. They may also utilize various types of technology during search and rescue operations. For example, the emergency responders may feed a camera on the end of a flexible pole into the collapsed building or other debris or rubble that may be used to determine whether there are any survivors in that area and to view the structural stability of the remaining portion of the building. Emergency responders may also use sound location devices that are connected to a microphone system to find survivors. For example, the sound location device may bang on the debris or rubble and if survivors tap back or call out for help, they may be found and assisted. Emergency responders may also utilize thermal image camera systems in an attempt to identify areas of body heat in the debris or rubble which may indicate the presence of a survivor. Carbon dioxide analyzers may also be used to detect individuals that may be unconscious but still breathing. In some cases, trained sniffer dogs may also be employed to find survivors.

SUMMARY

In one embodiment of the present invention, systems and techniques for quickly and efficiently identifying the locations of survivors of a disaster during a search and rescue operation are provided.

An exemplary system can include a plurality of robots distributed into a disaster area. Each robot comprises a memory, a network interface, and at least one processor operably coupled to the memory and the network interface. The at least one processor is configured to receive, via the network interface, discover packets broadcast by one or more mobile devices located in the disaster area. Each discover packet comprises information indicating how many other mobile devices in the disaster area are associated with the broadcasting mobile device. The at least one processor is further configured to determine a path along which to move the robot, responsive to receiving one or more of the discover packets. The path is determined based at least in part on the received one or more of the discover packets. The at least one processor is further configured to cause the robot to move according to the determined path.

An exemplary method according to another embodiment can include determining that no discover packets broadcast by one or more mobile devices located in a disaster area have been received. Responsive to the determination that no discover packets have been received, a path along which to move a robot is determined. The path is determined based on a plurality of risk analysis points. The risk analysis points are determined based on an analysis of the disaster area. The method further comprises causing the robot to move according to the determined path. The steps of the method may be carried out by at least one processor of the robot.

Embodiments of the of the present disclosure or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media). These and other illustrative embodiments include, without limitation, apparatus, systems, methods and processor-readable storage media.

These and other objects, features and advantages of the present invention will become apparent from the following detailed description of illustrative embodiments thereof, which is to be read in connection with the accompanying drawings.

DETAILED DESCRIPTION

Effectively searching for survivors in a disaster area is often a difficult task for emergency responders. It is important during any search and rescue operation to locate survivors as soon as possible. Every minute that passes reduces the chance that an individual who is trapped in the disaster area will survive. For example, a survivor may have sustained injuries that require medical treatment, may be trapped in an area with a limited supply of breathable air, may be trapped in an area that is not structurally sound and may collapse at any moment, or may be compromised by other similar time sensitive situations.

The techniques disclosed herein for quickly and efficiently identifying the locations of survivors of a disaster during a search and rescue operation utilize a combination of robotics and wireless communication technologies to enhance and accelerate the detection of survivors such that the locations of survivors may be identified more quickly and provided to emergency responders.

Figure 1:
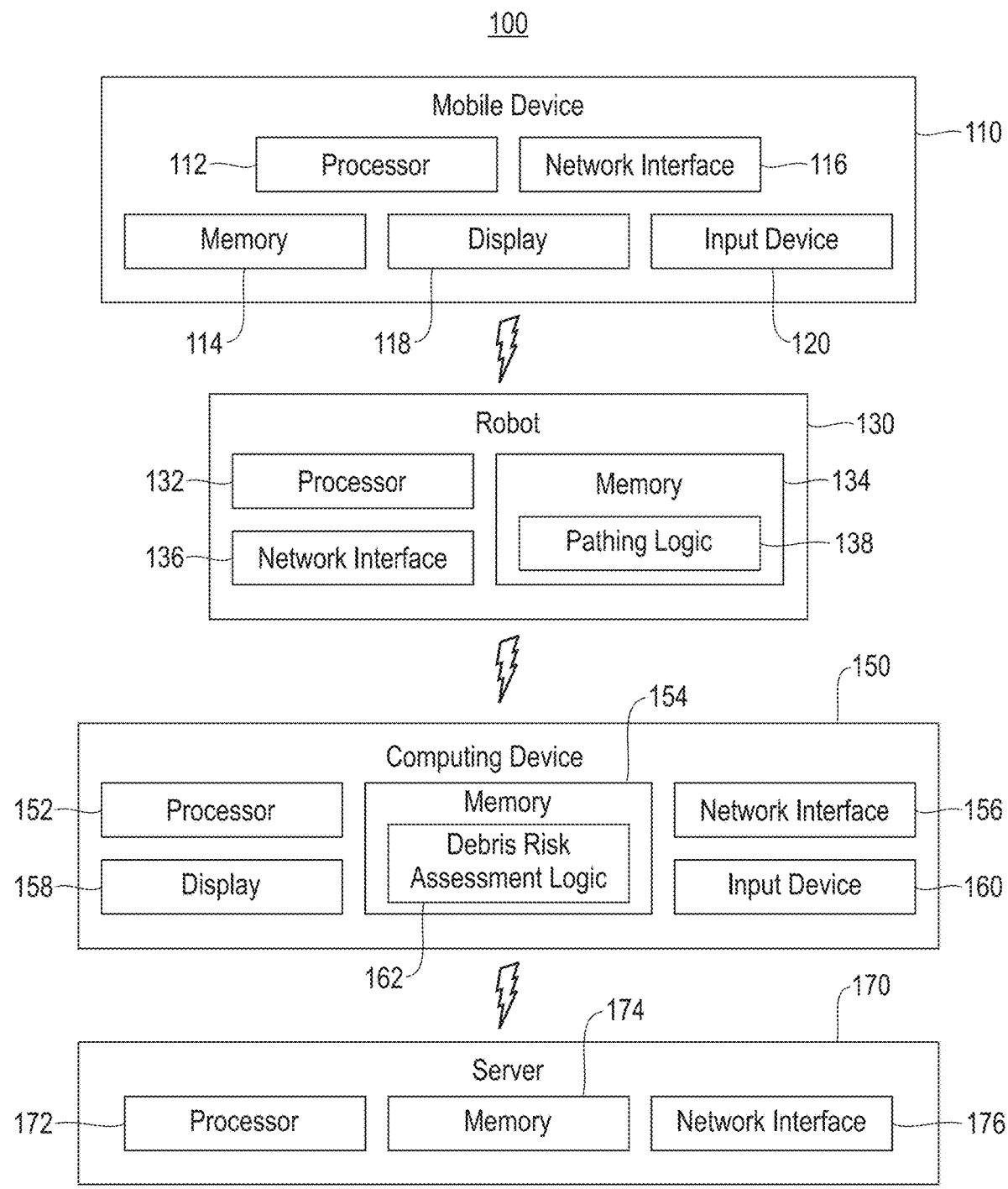
FIG. 1 is a diagram illustrating system architecture, according to an exemplary embodiment of the invention.

With reference now to FIG. 1, an embodiment of an example system architecture 100 for quickly and efficiently identifying the locations of survivors of a disaster during a search and rescue operation is illustrated. In some embodiments, system architecture 100 includes one or more mobile devices 110, one or more robots 130, one or more computing devices 150, and one or more servers 170.

Mobile device 110 includes at least one processor 112, memory 114, at least one network interface 116, a display 118, an input device 120, and may include any other features commonly found in a mobile device. In some embodiments, mobile device 110 may include, for example, a personal computer, laptop, tablet, smart device, smart phone, smart watch, or any other similar mobile device that may be used by a user and may be located near a survivor during a disaster.

Processor 112 may include, for example, a central processing unit (CPU), a microcontroller, Field Programmable Gate Array (FPGAs), or any other form of processing circuitry that is configured to perform various operations. Processor 112 may be configured to execute instructions as described below. These instructions may be stored, for example, in memory 114.

Memory 114 may include, for example, computer readable media or computer readable storage media in the form of volatile memory, such as random-access memory (RAM) and/or cache memory or others. Memory 114 may include, for example, other removable/non-removable, volatile/non-volatile storage media. By way of non-limiting examples only, memory 114 may include a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing.

In some embodiments, computer software including instructions or code for performing the methodologies of the invention, as described herein, may be stored in associated memory 114 and, when ready to be utilized, loaded in part or in whole (for example, into RAM) and implemented by processor 112. Such software could include, but is not limited to, firmware, resident software, microcode, and the like. The memory 114 may include local memory employed during actual implementation of the program code, bulk storage, and cache memories which provide temporary storage of at least some program code in order to reduce the number of times code must be retrieved from bulk storage during implementation.

Network interface 116 is configured to transmit and receive data or information to and from other mobile devices 110, robots 130, computing devices 150, server 170, or any other server, component, or computing device via wired or wireless connections. For example, network interface 116 may utilize wireless technologies and communication protocols such as Bluetooth®, WIFI (e.g., 802.11a/b/g/n), cellular networks (e.g., CDMA, GSM, M2M, and 3G/4G/4G LTE), near-field communications systems, satellite communications, via a local area network (LAN), via a wide area network (WAN), or any other form of communication that allows mobile device 110 to transmit or receive information to or from other mobile devices 110, robots 130, computing devices 150, and server 170.

In illustrative embodiments, mobile devices 110 may be configured to establish one or more local communication networks (LCNs) during a disaster. For example, in a situation where a mobile network associated with the mobile devices 110 is not available, e.g., due to damage, power loss, etc., mobile devices 110 may be configured to utilize one or more short range wireless communication channels such as, e.g., Bluetooth low energy (BLE), beacons, ultrasound, WIFI, or any other communication channel that is configured for short to moderate distance wireless communications between mobile devices to establish a LCN with one or more other mobile devices 110. In some embodiments, the LCN may be established by mobile devices 110 by broadcasting discover packets. For example, each mobile device 110 may broadcast discover packets to any other mobile device 110 that is within range of the network interface 116.

In some embodiments, LCNs are mobile device centric. For example, an LCN may be defined at each mobile device 110 based on the other mobile devices 110 from which it has received discover packets. For example, when a first mobile device 110 receives a discover packet from a second mobile device 110, the second mobile device 110 is added to the LCN of the first mobile device 110. Note that in some embodiments, no reply to the discover packet need be sent by the first mobile device 110 to the second mobile device 110 for the first mobile device 110 to add the second mobile device 110 to its LCN. In addition, in some embodiments, any additional mobile devices 110 that are listed in the discover packet received from the second mobile device 110 may also be included in the LCN of the first mobile device 110.

In some embodiments, the network interface 116 of each mobile device 110 may have a particular range or connectivity associated with its short-range wireless communications. For example, the range or connectivity may be different for mobile devices having different models, components, etc. In some cases, this range may also be reduced or limited due to debris or other obstructions in the disaster area.

In some embodiments, for example, where a first mobile device 110 has a network interface 116 that has a greater range or connectivity than the network interface 116 of a second mobile device 110, it is possible for the second mobile device 110 to receive a discover packet broadcast by the first mobile device 110, while the first mobile device 110 may not receive discover packets broadcast by the second mobile device 110. In this case, the first mobile device 110 may be included in the LCN of the second mobile device 110, but the second mobile device 110 may not be included in the LCN of the first mobile device 110 since the first mobile device 110 is not aware of the second mobile device.

In illustrative embodiments, discover packets comprise information associated with the broadcasting mobile device 110. The information may include, for example, device details about the broadcasting mobile device 110, e.g., owner name, connection details, user profile information, or any other information about the broadcasting mobile device or about a user of the broadcasting mobile device, and a list of other mobile devices that are reachable through the broadcasting mobile device 110, e.g., those mobile devices 110 that are included in the LCN of the broadcasting mobile device 110. In some embodiments, the information may also include device chain information for the broadcasting mobile device 110, e.g., the structure of the list of other mobile devices 110 including their relationship to the broadcasting mobile device 110, such as whether the broadcasting mobile device 110 received a given mobile device 110's discover packet directly or received information about the given mobile device 110 via a discover packet received from an intermediary mobile device 110. In some embodiments, for example, the chain of devices may be generated recursively based on a transitivity of discover packets across mobile devices, for example, by passing the discover packets, or the information contained therein, across multiple hops.

Display 118 may include any display device that is configured to display information to a user of mobile device 110. For example, in some embodiments, display 118 may include a computer monitor, television, smart television, or other similar displays. In some embodiments, display 118 may be integrated into or associated with mobile device 110, for example, as a display of a laptop, smart phone, smart watch, or other smart wearable devices, as a virtual reality headset associated with mobile device 110, or any other mechanism for displaying information to a user. In some embodiments, display 118 may include, for example, a liquid crystal display (LCD), an e-paper/e-ink display, an organic LED (OLED) display, or other similar display technologies. In some embodiments, display 118 may be touch-sensitive and may also function as an input device 120.

Input device 120 may include, for example, a keyboard, a mouse, a touch-sensitive display 118, a keypad, a microphone, or other similar input devices or any other input devices that may be used alone or together to provide a user with the capability to interact with a mobile device 110.

In illustrative embodiments, mobile devices 110 may, for example, be devices associated with individuals or survivors involved in a disaster or located in a disaster area.

Robots 130 may include, for example, a processor 132, memory 134, and a network interface 136 that may include similar functionality as processor 112, memory 114, and network interface 116. Robots 130 may, in some embodiments, be soft-robots that are configured to transform between at least a first shape and a second shape to penetrate or overcome obstacles in its path. Robots 130 are configured to traverse the disaster area while searching for signs of survivors according to pathing logic 138 stored in memory 134.

Network interface 136 may be configured to detect or receive broadcasts by mobile devices 110 and to identify a location of such mobile devices 110 relative to a location of the robot 130. The robot 130 is configured to determine a distance and direction to a mobile device 110 broadcasting discover packets, for example, based on changes in a signal strength of the broadcast as the robot 130 moves through the disaster area. In some embodiments, the network interface 136 may comprise directional antennae that may be used to identify directions of broadcasting mobile devices 110. For example, when broadcasts of discover packets are received by a robot 130 from more than one mobile device 110, the robot 130 may be configured to determine a direction of each broadcasting mobile device 110 using directional antennae.

In some embodiments, pathing logic 138 may configure the robot 130 to determine which mobile device 130 has more mobile devices 110 in its LCN, e.g., based on the information included in the received discover packets, and to move toward the mobile device 110 having more mobile devices 110 in its LCN as will be described in more detail below.

In some embodiments, the pathing logic 138 of a given robot 130 may be configured to plan a pathway or trajectory through the disaster area based on predetermined risk analysis points when no discover packets have been received by the given robot 130, as will be described in more detail below. In some embodiments, the risk analysis points may be received by the given robot 130, e.g., from computing device 150 or server 170, and may be stored in memory 134 for use by pathing logic 138.

In some embodiments, computing device 150 may include, for example, a processor 152, memory 154, a network interface 156, a display 158, and an input device 160 that may include similar functionality as processor 112, memory 114, network interface 116, display 118, and input device 120. In some embodiments, computing device 150 maybe a computing device associated with an emergency responder that is configured to manage a plurality of robots 130.

In some embodiments, computing device 150 may store and execute a debris risk assessment logic 162 that is configured to analyze the disaster area and generate risk analysis points for each location, structure, etc., in the disaster area for use by robots 130. The generation of risk analysis points will be described in more detail below.

Server 170 may include, for example, a processor 172, memory 174, and a network interface 176 that may include similar functionality as processor 112, memory 114, and network interface 116. In some embodiments, server 170 may, for example, be any computing device, server, database or similar system, or any combination thereof, that is configured to interact with or provide data to robots 130 or computing device 150. In some embodiments, for example, server 170 may include a distributed storage system including a plurality of servers, databases, or other components. In some embodiments, the data stored in server 170 may alternatively be stored in memory 154 of computing device 150 for use by computing device 150 in such a way that no connection to a server 170 is necessary to obtain the data. In some embodiments, server 170 may comprise a cloud server system or large-scale data processing system that is configured to implement the debris risk assessment logic 162. For example, computing device 150 may offload execution of the debris risk assessment logic 162 to the server 170 for generation of the risk analysis points which may then be provided to the robots 130, either directly from server 170 or via computing device 150, for use by the robots 130 in the pathing logic 138.

Figure 2:
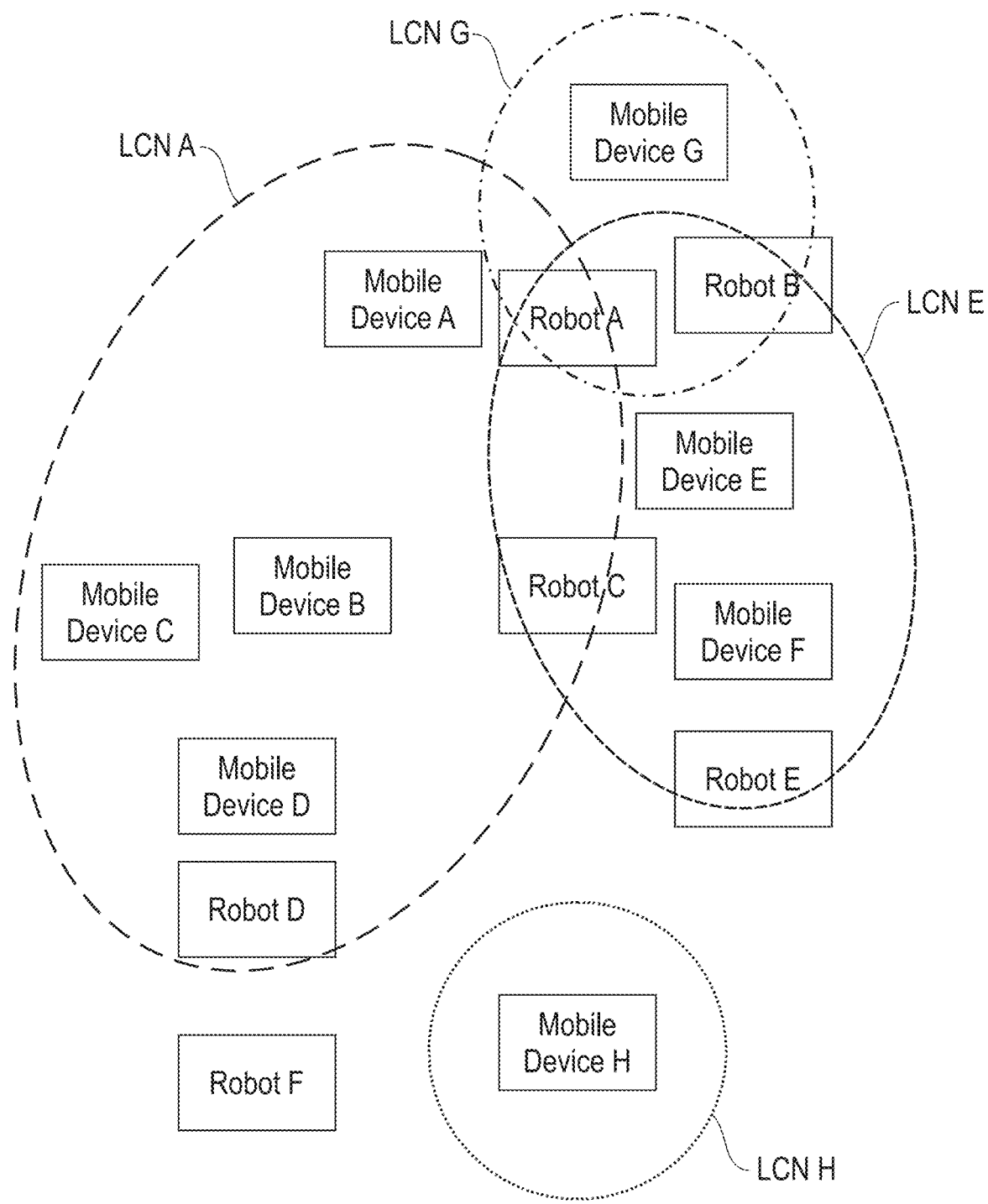
FIG. 2 is a diagram illustrating a disaster area according to an embodiment of the invention.
Figure 3:
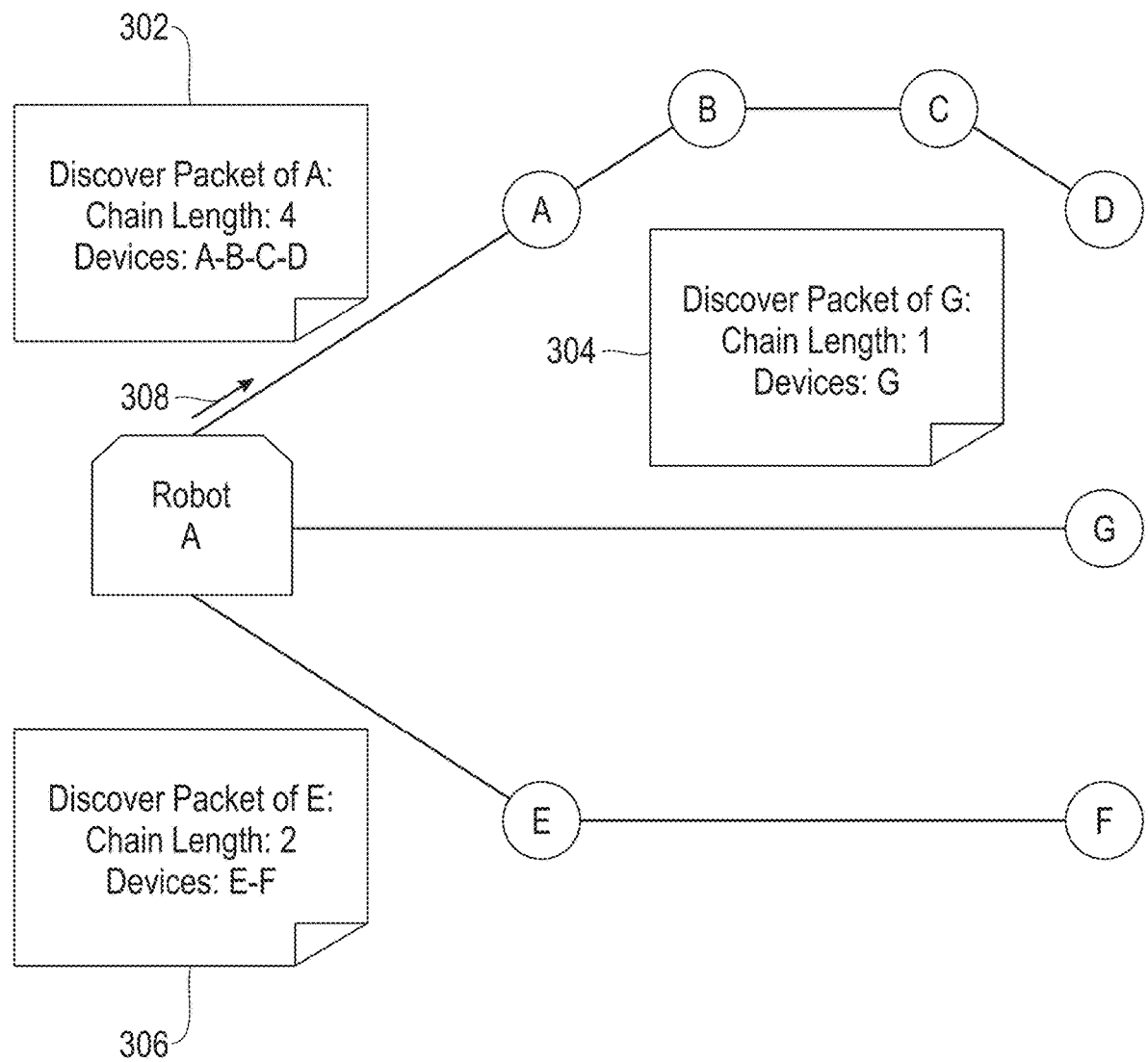
FIG. 3 is diagram illustrating pathing techniques according to an embodiment of the invention.

With reference now to FIGS. 2 and 3, an example of how robots 130 may be used during a search and rescue operation in a disaster area is illustrated.

FIG. 2 is a diagram illustrating an example disaster area 200, which may in some embodiments be a subset or sub-region of a larger disaster area. Mobile devices 110 of potential survivors in the disaster area 200 are illustrated, for example, as mobile devices A through H. For ease of understanding and for the purposes of this example, the network interfaces 116 of mobile devices A through H are assumed to have the same range and connectivity. As can be seen from FIG. 2, during a disaster, the mobile devices 110 may form LCNs using network interfaces 116, as described above. As an example, LCN A includes mobile devices A through D, LCN E includes mobile devices E and F, LCN G includes only mobile device G and LCN H includes only mobile device H. In this example, LCNs A, E, G, and H respectively define the LCNs of each included mobile device. For example, the respective LCN of each mobile device A through D in this example includes all of the mobile devices illustrated as part of LCN A. As illustrated in FIG. 2, the dashed lines corresponding to LCNs A, E, G, and H represent the range and connectivity of one or more of the mobile devices contained in that LCN.

With continued reference to FIG. 2, a plurality of robots 130 are distributed into the disaster area. For example, the robots 130 may be delivered to various points in the disaster area by vehicles, air dropped onto the disaster area, or otherwise distributed into the disaster area.

In the example illustrated in FIG. 2, for example, robots A through E have been distributed into disaster area 200. For example, at some time after distribution, robot A is located within range of LCNs A, E, and G, robot B is located within range of LCNs E and G; robot C is located within range of LCNs A and E; robot D is located within range of only LCN A; robot E is located within range of only LCN E; and robot F is not located within range of any of the LCNs.

Once distributed, the robots 130 may move according to pathing logic 138 to search for survivors. For example, pathing logic 138 may be configured to cause each robot A through F to initially move along a random path until it moves within range of one or more of the mobile devices A through H and detects a broadcast of a discover packet. In some embodiments, pathing logic 138 may be configured to determine the random path based on a risk score points analysis of the disaster area, as will be described in more detail below with reference to FIG. 4.

In response to receiving a discover packet from a single mobile device 110, pathing logic 138 is configured to cause the robot 138 to move toward the mobile device 110 broadcasting the discover packet. For example, as illustrated in FIG. 2, robot D has moved into range of LCN A and receives a discover packet, e.g., from mobile device D. Since robot D has only received a discover packet from mobile device D, pathing logic 138 causes robot D to move toward mobile device D in an attempt to identify a location of mobile device D in the disaster area 200. Similarly, robot E has moved into range of LCN E and receives a discover packet, e.g., from mobile device F. Since robot E has only received a discover packet from mobile device F, pathing logic 138 causes robot E to move toward mobile device F in an attempt to identify a location of mobile device F in the disaster area 200.

In some embodiments, for example, pathing logic 138 may determine the direction that the robot 130 has to move based on signal strength variation. For example, as the robot 130 moves relative to a given mobile device 110, the signal strength of the discover packet broadcasts from the given mobile device 110 will vary. This variance in signal strength may be used to determine whether the robot 130 is moving toward or away from the given mobile device 110 and may be used by pathing logic 138 to correct a direction of movement of the robot 130. Alternative methods of determining a movement direction for a robot 130 based on a received broadcast may also be used.

In response to receiving discover packets from multiple mobile devices 110, pathing logic 138 is configured to determine which of the mobile devices 110 has more mobile devices 110 associated with its LCN. For example, with reference to FIGS. 2 and 3, robot A has moved to a location where broadcasted discover packets are received from multiple mobile devices 110, e.g., mobile devices A, E, and G. Each of mobile devices A, E, and G, has an associated LCN, e.g., LCNs A, E, and G. In this case, the broadcasted discover packet received from mobile device A includes information about other mobile devices within LCN A, e.g., mobile devices B, C, and D.

As seen in FIG. 3, for example, a discover packet 302 received by robot A from mobile device A (illustrated as "A") includes information about a structure of LCN A. For example, the information in discover packet 302 may indicate that mobile device A has received discover packets directly from mobile device B (illustrated as "B"), but not mobile devices C (illustrated as "C") and D (illustrated as "D"); that mobile device B has received discover packets directly from mobile devices A and C but not mobile device B; that mobile device C has received discover packets directly from mobile devices B and D, but not mobile device A; and that mobile device D has received discover packets directly from mobile device C but not mobile devices A or B. As illustrated in FIG. 3, for example, the information included in discover packet 302 may indicate a chain of mobile devices 110 where, for example, the chain may be represented by A-B-C-D with a maximal chain length of four mobile devices. Similar discover packets 304 and 306 are received by robot A from mobile devices G and E respectively.

Based on the received discover packets 302-306, the pathing logic 138 of robot A determines which of mobile devices A, E, or G to move robot A toward. In some embodiments, for example, pathing logic 138 is configured to identify which mobile device has more mobile devices in its LCN, e.g., based on the mobile devices identified in its respective discover packet, and to move the robot toward that mobile device. In such an embodiment, based on the received discover packets 302-306 illustrated in FIG. 3, pathing logic 138 would determine to move robot A toward mobile device A, as indicated by arrow 308, since the information included in discover packet 302 received from mobile device A has a longer chain, e.g., a chain length of 4, and more mobile devices within its chain, than the information included in discover packets 304 and 306 received from mobile devices G and E respectively. While chain length or number of mobile devices indicated in the information included in a discover packet is one way of determining which mobile device to move a robot toward, other ways of determining which mobile device to move a robot toward may alternatively be used.

With reference again to FIGS. 2 and 3, as another example, robot B has moved to a location where robot B receives discover packets from both mobile device G and mobile device E. In this case, based on the pathing logic 138 described above, robot B will be moved toward mobile device E instead of mobile device G since there are more devices included in the LCN of mobile device E, e.g., more mobile devices in the chain of the discover packet 306 received from mobile device E (i.e., mobile devices E and F) than in the chain of the discover packet 304 received from mobile device G, i.e., only mobile device G.

With continued reference to FIG. 2, as another example, robot C has moved to a location where robot C receives discover packets from both mobile device B and mobile devices E and F. In this case, based on the pathing logic 138 described above, robot B will be moved toward mobile device B instead of mobile devices E and F since there are more devices included in the LCN of mobile device B, e.g., more devices in the chain of the discover packet received from mobile device B (i.e., mobile devices A, B, C, and D) than the chains of the discover packets received from mobile devices E and F (just mobile devices E and F for each discover packet).

In some embodiments, the robot may include directional antennae as part of network interface 136 which may be utilized by pathing logic 138 to determine a direction of the mobile device 110 that the robot has received discover packets from. In some embodiments, signal strength may also be used as described above, to determine a direction to the target mobile device.

In some embodiments, a robot may be located in a location where no discover packets will be received. For example, with reference again to FIG. 2, robot F has moved to a location where no discover packets are received since robot F is not within range of any of mobile devices A through F. In such embodiments, when no discover packet has been received by the robot, pathing logic 138 may be configured to plan a path of the robot based on risk analysis points such that it will cause the robot to move towards a location in the disaster area 200 where the risk is high that there will be survivors based on debris risk assessment techniques.

Figure 4:
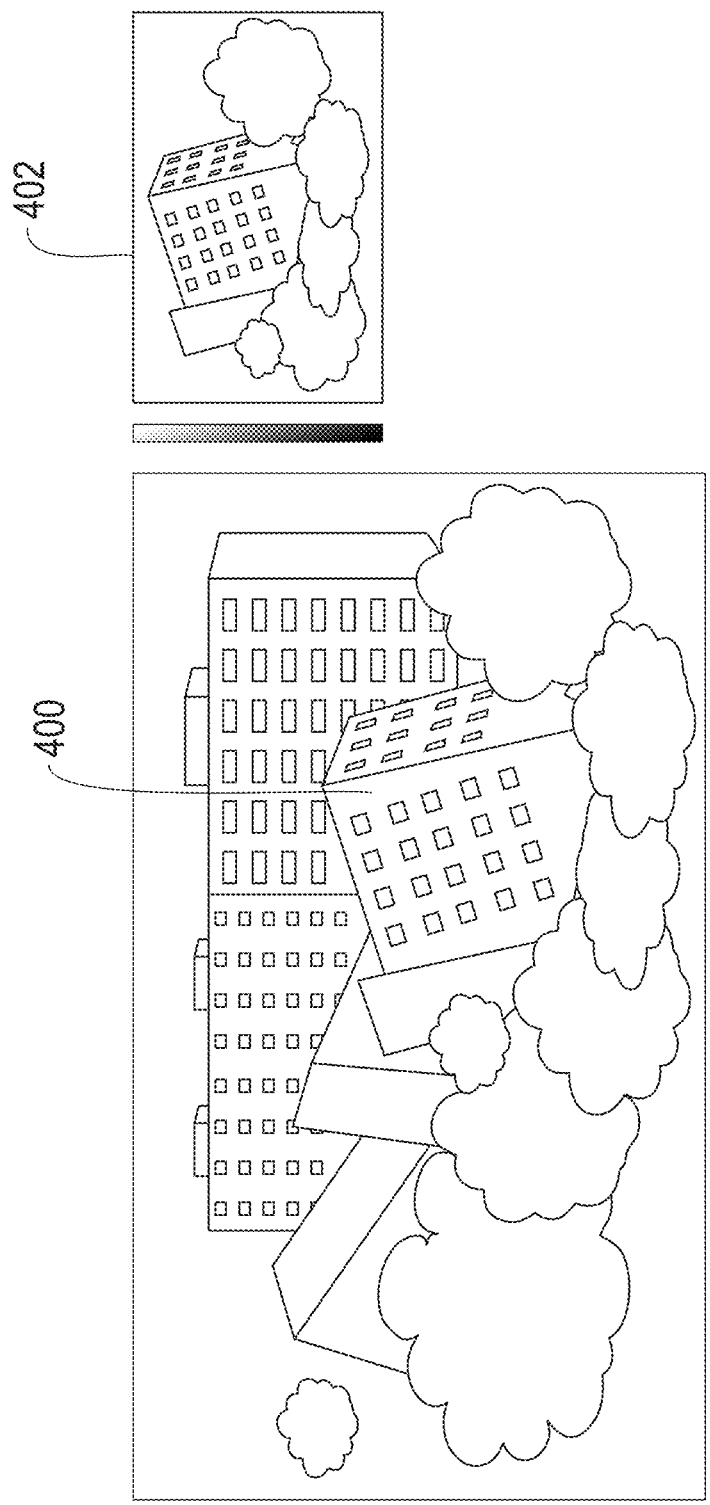
FIG. 4 is diagram illustrating a risk assessment tool according to an embodiment of the invention.

With reference now to FIG. 4, for example, risk analysis points for the disaster area may be generated in one or more dimensions.

For example, a first dimension may include a simulation of building models for buildings in the disaster area after a disaster has occurred based on a source of the disaster. For example, as illustrated in FIG. 4, a building 400 or other structure in the disaster area may be modeled by three dimensional (3D) modeling software to generate a simulated model 402 and the damage to the building 400 from the disaster may be simulated to determine potential locations where pockets or voids holding survivors may be located.

As another example, a second dimension may include the use of indoor-localization to identify potential locations for survivors. For example, data indicating the locations of potential survivors just before the disaster occurred may be obtained, e.g., based on cameras, GPS, door entry/exit card readers, computer usage, climate control systems that predict occupancy rate, heat maps, prediction models or other similar technology, and may be used to predict or identify target locations to be searched that have a high probability of having survivors, e.g., due to the presence of a large number of individuals pre-disaster.

In some embodiments the first and second dimensions described above may be used individually to generate risk analysis points for each location or quadrant in the disaster area. In some embodiments, the risk analysis points for each location or quadrant may be determined based on the combination of the first and second dimensions. Any other dimensions may also be used or included in determining the risk analysis points.

As an example, the presence of individuals at a particular location, as identified by the second-dimension indoor-localization, may be compared to the identified pockets or voids identified by the first-dimension simulation. If the indoor-localization matches an identified pocket or void, that location may be assigned more risk analysis points as compared to a location meeting the criteria for only one of the dimensions or none of the dimensions. For example, a location having a match between the first and second dimension may be given 10 risk analysis points while a location meeting the criteria for only one of the first and second dimensions may be given 5 risk analysis points and a location meeting the criteria for neither dimension may be given 0 risk analysis points, e.g., no presence of individuals detected using indoor-localization and no pockets or voids identified using the simulation.

The risk analysis points may be provided to the robots 130, for example, prior, during, or after distribution of the robots 130 into the disaster area via computing device 150 or server 170, and may be used by the pathing logic 138 of the robots 130 to determine a path when no broadcasted discover packets have been received.

In some embodiments, the robots 130 may comprise soft-robotics that are configured to transform between two or more shapes or states. Each robot 130 may have a power supply having a particular amount of available power to be used during the search and rescue operation with each type of transformation having an associated power cost which may be a pre-defined value for each transformation.

In some embodiments, when a robot 130 encounters an obstacle while traversing the path according to pathing logic 138, pathing logic 138 may determine whether to penetrate or overcome the obstacle, e.g., through transformation between the two or more shapes, or to avoid the obstacle by determining a new path. For example, pathing logic 138 may determine a transformation cost associated with overcoming the obstacle.

In some embodiments, the transformation cost may compare the power cost to make a transformation to overcome the obstacle (or both the transformation and a further transformation to return to the original or another shape) with the probability that additional survivors will be discovered by overcoming the obstacle.

For example, the pathing logic 138 may be configured to analyze the obstacle to determine which shape will penetrate or overcome the obstacle. In some embodiments, for example, electromagnetic waves, ultrasound, or other similar technologies may be used to analyze the obstacle. Based on the analysis, the pathing logic 138 may identify a target shape and may determine the associated power cost to transform into that shape (or to both turn into and revert back from that shape).

The pathing logic 138 may also be configured to determine a probability that new survivors will be discovered if the robot 130 traverses the obstacle, for example, based on the risk analysis points described above. For example, the risk analysis points determined for a particular location in the disaster area may be indicative of the probability that a new survivor will be discovered. For example, the higher the number of points, the greater the probability that a survivor may be present at that location.

The pathing logic 138 compares the determined power cost to the probability that new survivors will be discovered to determine the transaction cost. For example, the determined power cost may be weighed against the probability that new survivors will be discovered, and a transaction cost may be determined on the basis of this analysis. In some embodiments, for example, a linear equation may be used to determine the transaction cost, e.g., the transaction costs increase as the probability of finding survivors decreases or the power cost increases. If the transaction cost is greater than a predetermined threshold, the pathing logic 138 may determine that the obstacle should be avoided and may cause the robot 130 to follow a path around the obstacle according to the risk analysis points as described above or to move toward a different mobile device 110, e.g., the mobile device 110 that broadcasted a discover packet containing the next highest number of mobile devices 110 in its chain of mobile devices 110.

If the transaction cost is less than or equal to the predetermined threshold, the pathing logic 138 causes the robot 130 to transform into the target shape and overcome the obstacle. The robot 130 may then continue along the path determined by the pathing logic 138, e.g., moving toward the target mobile device according to the pathing logic 138.

In some embodiments, the predetermined threshold may be determined, for example, based on empirical analysis and calibrations are determined based on use-cases.

In some embodiments, when a robot 130 receives a broadcasted discover packet from a mobile device 110, the robot 130 may transmit an indication that a discover packet has been received to computing device 150 or server 170. In some embodiments, the indication may include a location of the robot 130, direction from the robot 130 toward the mobile device 110, or other similar information. In some embodiments, the indication may also or alternatively be transmitted when the robot 130 moves within a predetermined distance of the mobile device 110, for example, based on signal strength of the broadcasts, or other similar information.

The use of robots 130 and pathing logic 138 as described above provides improved and intelligent pathway planning such that the robots 130 are able to reach mobile devices 110 associated with survivors in a disaster area in the least amount of time as possible to allow emergency responders to assist and recover survivors as quickly and efficiently as possible. In addition, by planning pathways based on the chains of mobile devices found in received discover packets and using risk analysis points to move toward high priority areas when no discover packets are received, the disclosed pathing logic 138 may focus on locations which area likely to have more survivors who can be saved. The use of soft-robotics to overcome potential obstacles based on a risk-reward determination also provides the most efficient use of the robots in searching for the highest percentage chance of finding survivors.

Figure 5:
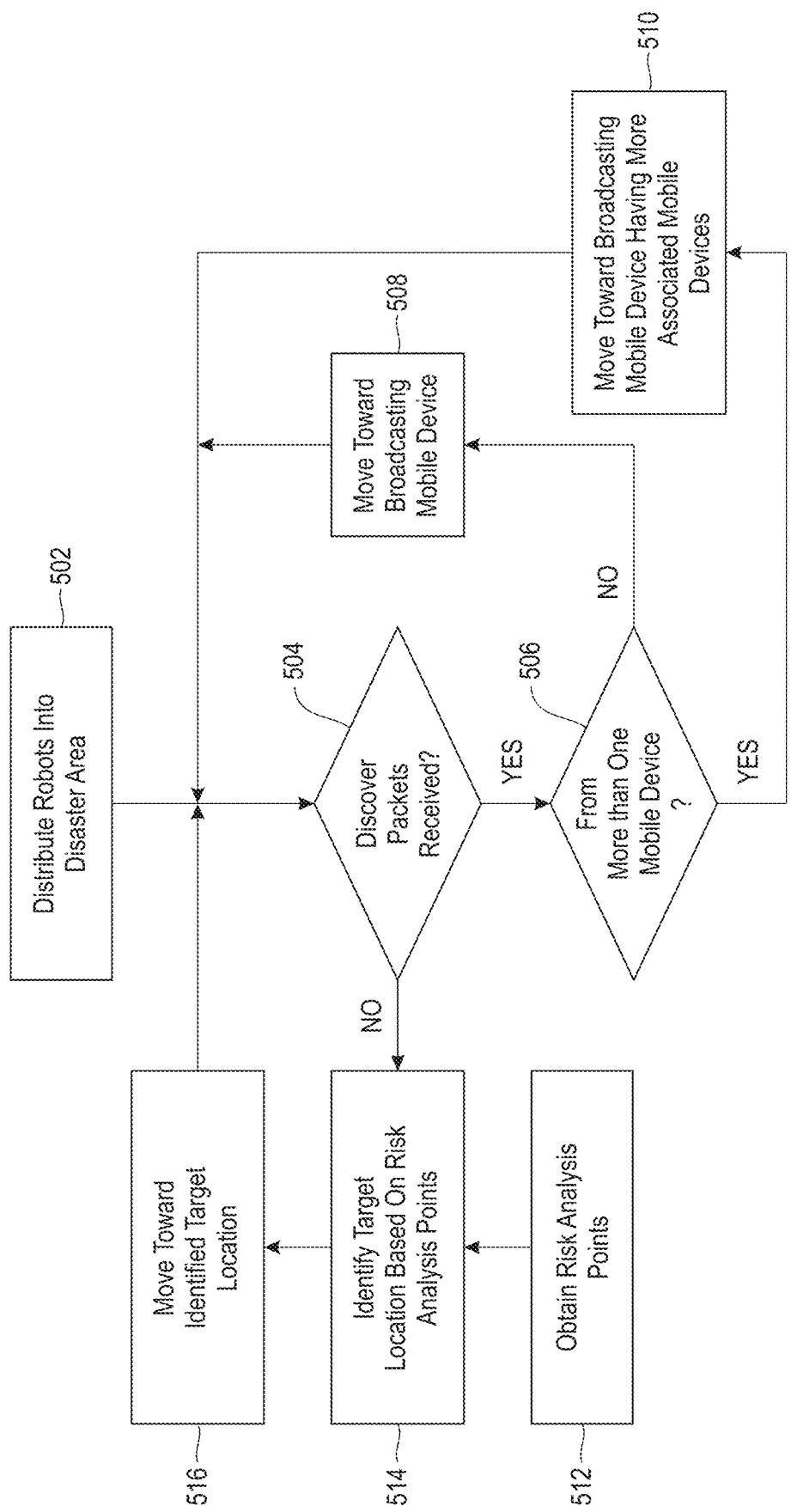
FIG. 5 is a flow diagram illustrating techniques according to an embodiment of the invention.

FIG. 5 is a flow diagram illustrating a method implemented by pathing logic 138 according to an illustrative embodiment.

At 502, robots 130 are distributed into a disaster area as described above.

At 504, the pathing logic 138 of a given robot 130 determines whether a discover packet has been received by the given robot 130.

At 506, if a discover packet has been received by the given robot 130, pathing logic 138 determines whether discover packets from more than one mobile device have been received by the given robot 130.

If pathing logic 138 determines that the given robot 130 has received discover packets from only one mobile device 110 at 506, pathing logic 138 causes the given robot 130 to move towards the mobile device 110 at 508. The method then returns to step 504 and pathing logic 138 continues to determine whether new discover packets have been received.

If pathing logic 138 determines that the given robot 130 has received discover packets from more than one mobile device 110 at 506, pathing logic 138 causes the given robot 130 to move toward the mobile device 110 that has more mobile devices 110 associated with it at 510, e.g., based on the information contained in the discover packets. For example, as described above, pathing logic 138 may determine which mobile device has more associated mobile devices based on the chain length or number of mobile devices identified or indicated in the information contained in a received discover packet. The method then returns to step 504 and pathing logic 138 continues to determine whether new discover packets have been received.

At 512, risk analysis points are obtained by a robot 130, for example, as described above. For example, a computing device 150 or server 170 may generate risk analysis points for use by robot 130 and may provide the risk analysis points to the robot pre-distribution, during distribution, or post-distribution.

If pathing logic 138 determines that no discover packets were received by the given robot 130 at 504, pathing logic identifies a target location based on the obtained risk analysis points at 514, for example, as described above.

At 516, pathing logic 138 causes the given robot 130 to move toward the identified target location. The method then returns to step 504 and pathing logic 138 continues to determine whether new discover packets have been received.

While moving toward a target location or a broadcasting mobile device in steps 508, 510, or 516, the robot 130 may encounter an obstacle. If an obstacle is encountered, pathing logic 138 is configured to determine the transformation score as described above, e.g., based on an analysis that takes into account power cost and probability of locating new survivors, and may cause the robot 130 to either transform into another shape to overcome the obstacle, or reroute the movement of the robot 130 around or away from the obstacle based on an outcome of the analysis described above.

The techniques depicted in FIGS. 1-5 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIGS. 1-5 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

The present invention may be a system, a method, and/or a computer program product at any possible technical detail level of integration. The computer program product may include a computer readable storage medium (or media)

having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
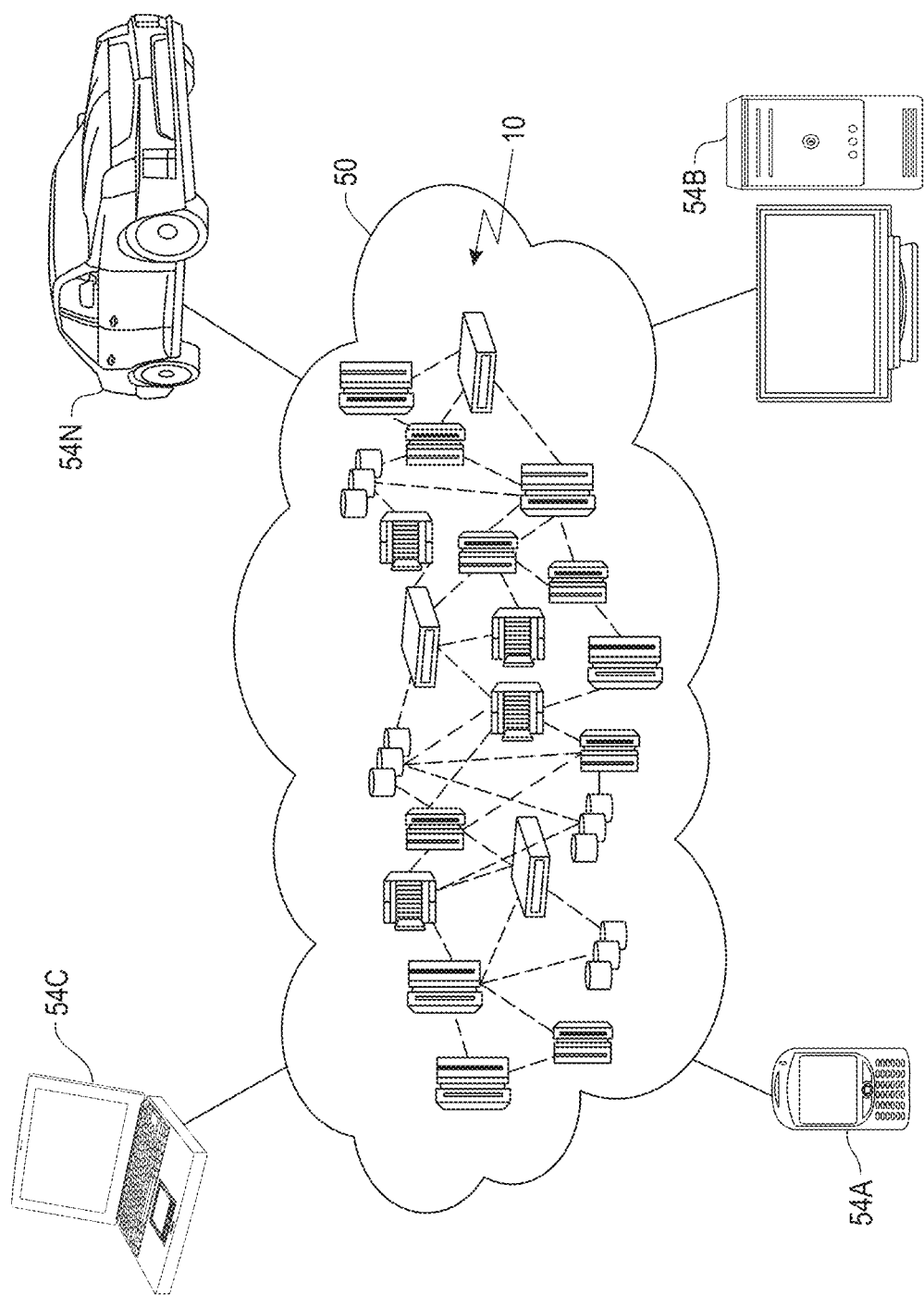
FIG. 6 depicts a cloud computing environment according to an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
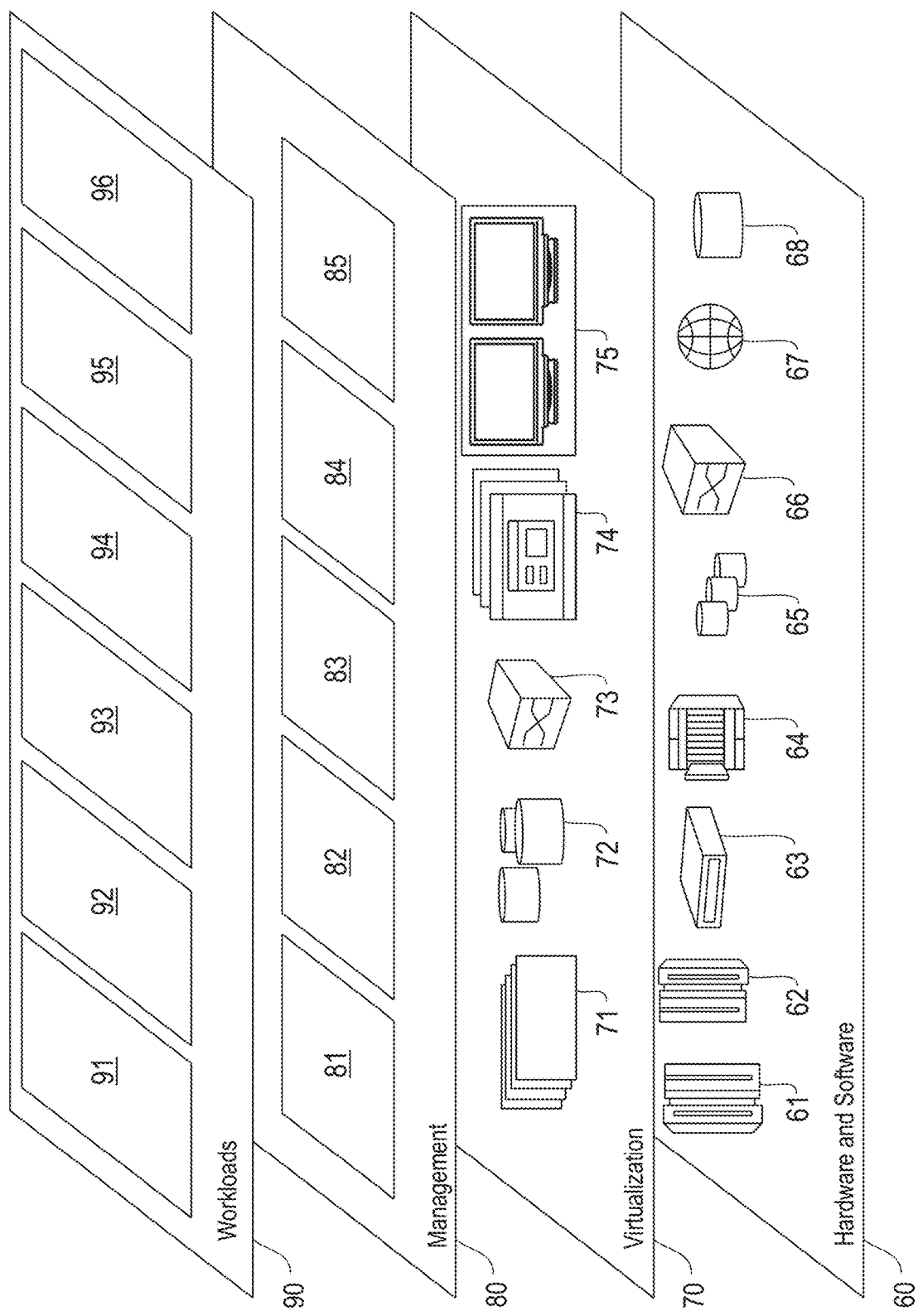
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and debris risk assessment logic 96.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
  a plurality of robots distributed into a disaster area, each robot comprising:
    a memory;
    a network interface; and
    at least one processor operably coupled to the memory and the network interface, the at least one processor configured to:
      receive, via the network interface, discover packets broadcast by at least one mobile device located in the disaster area, each discover packet comprising information indicating how many other mobile devices in the disaster area are associated with the broadcasting mobile device, wherein the broadcasting mobile device generates the discover packet based at least in part on discover packets received by the broadcasting mobile device from one or more of the other mobile devices, and wherein the information comprises a chain of the other mobile devices, the chain indicating (i) which of the other mobile devices the broadcasting mobile device has received discover packets from and (ii) which of the other mobile devices are identified indirectly via the discover packets received by the broadcasting mobile device from the other mobile devices;
      responsive to receiving one or more of the discover packets, determine a path along which to move the robot, the determined path based at least in part on the received one or more of the discover packets; and
      cause the robot to move according to the determined path.

2. The system according to claim 1, wherein the information indicating how many other mobile devices in the disaster area are associated with the broadcasting mobile device comprises a list of the other mobile devices associated with the broadcasting mobile device.

3. The system of claim 1, wherein the at least one processor is further configured to, responsive to receiving discover packets from a plurality of the mobile devices, determine which of the plurality of mobile devices is associated with the greatest number of other mobile devices based on the information, wherein determining the path comprises determining the path to the mobile device determined to be associated with the greatest number of other mobile devices.

4. The system of to claim 1, wherein at least one of the robots is a soft-robot that is configured to transform between two or more shapes, the at least one processor of the soft-robot configured to cause the robot to transform between the two or more shapes.

5. The system of claim 4, wherein in response to the soft-robot encountering an obstacle along the path, the at least one processor of the soft-robot is configured to determine a shape from the two or more shapes that is predicted to overcome the obstacle.

6. The system of claim 5, wherein the at least one processor of the soft-robot is configured to:
  determine a transformation cost associated with transforming the soft-robot into the determined shape to overcome the obstacle;

responsive to the transformation cost being greater than a predetermined threshold, determining a new path that avoids the obstacle; and responsive to the transformation cost being less than or equal to the predetermined threshold, causing the soft-robot to transform into the determined shape to overcome the obstacle.

7. The system of claim 6, wherein the transformation cost takes into account a power cost associated with transforming the soft-robot into the determined shape to overcome the obstacle and a probability that new survivors will be located due to overcoming the obstacle.

8. The system of claim 1, wherein the at least one processor is further configured to, responsive to no discover packets being received, determine the path based on a plurality of risk analysis points, the risk analysis points being determined based on an analysis of the disaster area.

9. The system of claim 8, wherein said determining the risk analysis points comprises:
   simulating a change in at least one structure in the disaster area from a pre-disaster state to a post-disaster state;
   obtaining indoor-localization data for the at least one structure, the indoor-localization data comprising an indication of locations of potential survivors within the at least one structure in the pre-disaster state; and
   determining risk analysis points for the at least one structure based on the simulated change in the at least one structure and the obtained indoor-localization data, the risk analysis points indicating the probability of survivors within the at least one structure at any given location.

10. The system of claim 9, wherein said determining the path based on the plurality of risk analysis points comprises selecting the risk analysis point having the highest probability of survivors and determining a path to a location associated with the selected risk analysis point.

11. A computer-implemented method, the method comprising steps of:
   receiving discover packets broadcast by at least one mobile device located in a disaster area, each discover packet comprising information indicating how many other mobile devices in the disaster area are associated with the broadcasting mobile device, wherein the broadcasting mobile device generates the discover packet based at least in part on discover packets received by the broadcasting mobile device from one or more of the other mobile devices, and wherein the information comprises a chain of the other mobile devices, the chain indicating (i) which of the other mobile devices the broadcasting mobile device has received discover packets from and (ii) which of the other mobile devices are identified indirectly via the discover packets received by the broadcasting mobile device from the other mobile devices;
   responsive to receiving the one or more discover packets, determining a path along which to move a robot, the determined path based at least in part on the received one or more discover packets; and
   causing the robot to move according to the determined path;

wherein the steps are carried out by at least one processor of the robot.

12. The computer-implemented method of claim 11, comprising:
   responsive to receiving discover packets from a plurality of the mobile devices, determining which of the plurality of mobile devices is associated with the greatest number of other mobile devices based on the information, wherein determining the path comprises determining the path to the mobile device determined to be associated with the greatest number of other mobile devices.

13. The computer-implemented method of claim 11, wherein:
   the robot is a soft-robot that is configured to transform between two or more shapes;
   in response to the soft-robot encountering an obstacle along the path, the method comprising:
      determining a shape from the two or more shapes that is predicted to overcome the obstacle;
      determine a transformation cost associated with transforming the soft-robot into the determined shape to overcome the obstacle;
      responsive to the transformation cost being greater than a predetermined threshold, determining a new path that avoids the obstacle; and
      responsive to the transformation cost being less than the predetermined threshold, causing the soft-robot to transform into the determined shape to overcome the obstacle,
   wherein the transformation cost takes into account a power cost associated with transforming the soft-robot into the determined shape to overcome the obstacle and a probability that new survivors will be located due to overcoming the obstacle.

14. A computer program product comprising a computer readable storage medium having program instructions embodied therewith, the program instructions executable by at least one processor of a robot to cause the robot to:
   receive discover packets broadcast by at least one mobile device located in the disaster area, each discover packet comprising information indicating how many other mobile devices in the disaster area are associated with the broadcasting mobile device, wherein the broadcasting mobile device generates the discover packet based at least in part on discover packets received by the broadcasting mobile device from one or more of the other mobile devices, and wherein the information comprises a chain of the other mobile devices, the chain indicating (i) which of the other mobile devices the broadcasting mobile device has received discover packets from and (ii) which of the other mobile devices are identified indirectly via the discover packets received by the broadcasting mobile device from the other mobile devices;
   responsive to receiving one or more of the discover packets, determine a path along which to move the robot, the determined path based at least in part on the received one or more of the discover packets; and
   cause the robot to move according to the determined path.

* * * * *